(12) United States Patent
Akopian et al.

(10) Patent No.: US 6,466,164 B1
(45) Date of Patent: Oct. 15, 2002

(54) METHOD AND APPARATUS FOR CALCULATING PSEUDORANGE FOR USE IN RANGING RECEIVERS

(75) Inventors: David Akopian, Tampere (FI); Jari Syrjärinne, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/950,552

(22) Filed: Sep. 10, 2001

(51) Int. Cl.$^7$ .............................. G01S 5/02; H04B 7/185
(52) U.S. Cl. .............................. 342/357.15; 342/357.12; 701/213
(58) Field of Search ................... 342/357.06, 357.15, 342/357.12; 701/213

(56) References Cited

U.S. PATENT DOCUMENTS

| | | | |
|---|---|---|---|
| 6,204,808 B1 * | 3/2001 | Bloebaum et al. | 342/357.07 |
| 6,208,291 B1 * | 3/2001 | Krasner | 342/357.12 |
| 6,259,401 B1 * | 7/2001 | Woo | 342/357.12 |

OTHER PUBLICATIONS

*Time recovery through fusion of inaccurate network timing assistance with GPS measurement,* J. Syrjärinne, Proc. $3^{rd}$ Int. Conference on Information Fusion, Paris, France, Jul. 10–13 2000, vol. II, pp. WeD5–3–WeD–10.

*Possibilities for GPS time recovery with GSM network assistance,* J. Syrjärinne, Proc. ION GPS 2000, Salt Lake City, Utah, US, Sep. 19–22, 2000.

* cited by examiner

*Primary Examiner*—Theodore M. Blum
(74) *Attorney, Agent, or Firm*—Ware, Fressola, Van Der Sluys & Adolphson LLP (57) ABSTRACT

A system, apparatus, and corresponding method for measuring a pseudorange from a ranging receiver to a beacon (such as a GPS satellite). It determines the time of transmission of a target ranging signal fragment (for which the difference in time between transmission and reception is essentially the pseudorange) even in poor signal conditions when the navigation data of the ranging signal cannot be accurately decoded by the ranging receiver. It is based on making either an estimate of the start time for the particular information element of the ranging signal (usually a navigation data bit) beginning just before the target ranging signal fragment (if the quality of the ranging signal allows such an estimate to be made), or (in any case) based on making an estimate of the time corresponding to the start of the code epoch of the ranging signal that just precedes the target ranging signal fragment.

22 Claims, 3 Drawing Sheets

METHOD AND APPARATUS FOR CALCULATING PSEUDORANGE FOR USE IN RANGING RECEIVERS

FIELD OF THE INVENTION

The invention relates to ranging receivers, e.g. receivers used for receiving navigation information from the well-known global positioning system, and more particularly to the calculation of pseudoranges by ranging receivers.

BACKGROUND OF THE INVENTION

In the well known Global Positioning System (GPS), a time-stamped signal is transmitted by a GPS satellite as the basis for a pseudorange calculation by a GPS receiver, as part of the determination by the GPS receiver of the position of the GPS receiver or other navigation information useful to the GPS receiver. The GPS receiver measures (records) the time of arrival (TOA) of a target signal fragment (a particular point on the signal, the point that happens to be received at the instant the receiver schedules for a position measurement) based on the GPS receiver clock. If the GPS receiver clock were synchronized with the GPS satellite clock, since the signal includes a time stamp so that the time of transmission (TOT) of the target signal fragment can be determined, the GPS receiver would know the time it took for the target signal fragment to propagate from the GPS satellite to the GPS receiver, which, when multiplied by the speed of light, would yield the range (actual distance) between the GPS satellite and the GPS receiver. (The receiver would simply note the time it received the target signal fragment received at the moment scheduled for a position determination, and would determine when the target signal fragment was transmitted by finding the last time-stamped signal fragment received before the target signal fragment, and based on a knowledge of the structure of the signal, determining how much later the target signal fragment was transmitted, compared to the time-stamped fragment of the signal.)

Each GPS satellite includes a clock that is approximately synchronized with GPS time, and each GPS satellite broadcasts information needed by a GPS receiver to correct the GPS satellite clock to essentially exact GPS time. Thus, each GPS receiver knows how to correct the time stamp of a signal fragment by a GPS satellite so that the time stamp is translated to precise GPS time. However, GPS receivers usually include relatively inexpensive clocks, which must be synchronized with GPS time each time a receiver is turned on, and periodically thereafter. Therefore, when a GPS receiver determines its range from a GPS satellite based on the time-stamp of a signal fragment and the time (according to the GPS receiver clock) it received a target signal fragment, the result is off from the true range, and is conventionally called the pseudorange to indicate the error. The pseudorange is the true range plus the error due to the GPS receiver clock being offset from GPS time. A GPS receiver typically determines its position by acquiring pseudoranges from usually four satellites, which allows the GPS receiver to simultaneously determine its position as well as the offset of its clock compared to GPS time.

GPS satellites broadcast navigation data (including their ephemerides and health information) using a direct sequence spread spectrum signal. Doing so allows all of the satellites to share the same frequency spectrum. Each satellite modulates the same carrier frequency with a PRN code (via binary phase shift key modulation) as well as with the navigation data for the satellite. A receiver must acquire and track the signal from a GPS satellite in order to read the navigation data from the satellite. The acquisition and tracking of a GPS signal for a particular one of the GPS satellites amounts to synchronizing the received PRN code for the GPS satellite (obtained from the received signal after removing the carrier frequency) with a replica of the PRN code generated by the GPS receiver. A correlator determines at what relative position the replica PRN code is in phase with the received PRN code.

In actual operation of a GPS receiver in good signal conditions (so that the GPS receiver can decode the time-stamp of the signal fragment), the GPS receiver determines precisely when a target signal fragment was transmitted by a satellite using a procedure that depends on aligning a replica of the PN code for the satellite. A GPS signal from a satellite includes a navigation data component at 50 Hz, and one or another pseudorandom number (PRN) sequences. One such PRN sequence, called the C/A (coarse acquisition) sequence, is a 1023 bit-long code broadcast as a 1.023 MHz signal; the 1.023 C/A signal thus has a period (epoch) of 1023 bits (called chips, to distinguish these from the bits of the navigation data message). A bit of the navigation data therefore has a duration of 20 ms, and a chip of the C/A code therefore has a duration of 1 ms. A receiver schedules a position measurement at a certain moment, and at the scheduled moment target signal fragments arrive from the set of satellites for which pseudoranges will be determined. The navigation data for a satellite is provided in five subframes of 300 bits each, making a frame of 1500 bits, broadcast over a period of 6 seconds. Each subframe provides a so-called TOW time stamp, which indicates the GPS time at which a corresponding particular bit of the navigation message was transmitted. (The GPS time so indicated is off from true GPS time, but the navigation data includes corrections to it, so that for all practical purposes, the TOW is according to true GPS time.) For each such satellite, the time of transmission of the target signal fragment is determined using:

$$T_{TOT}{}^k = TOW^k + N_{bit}{}^k + N_{ms}{}^k + N_{chip}{}^k + \Delta_{chip}{}^k, \qquad (1)$$

where $TOW^k$ is the time of week at which the bit corresponding to the TOW time stamp was transmitted, and the other terms add to that time of week the time increments needed to arrive at the time the target signal fragment was transmitted. Of the other terms, $N_{bit}{}^k$ is the time duration corresponding to the whole number of (20 ms) data bits transmitted after the TOW time stamp data bit (i.e. the data bit for which the TOW is given) and before the target signal fragment, $N_{ms}{}^k$ is the time duration corresponding to the whole number of (1 ms) epochs of PRN codes transmitted after the last whole data bit and before the target signal fragment, $N_{chip}{}^k$ is time duration corresponding to the whole number of (1 microsecond) chips transmitted after the last whole PRN epoch and before the target signal fragment, and $\Delta_{chip}{}^k$ is the time duration corresponding to the fraction of a chip transmitted after the last whole chip and before the target signal fragment. The quantity $N_{chip}{}^k + \Delta_{chip}{}^k$ is called the sub-millisecond component of the time of transmission.

Once the TOT for a target signal is determined for enough satellites, the receiver (or a computing facility in communication with the receiver) determines the receiver position as well as the difference in the receiver clock and GPS time at the time of arrival of the target signal fragment using for example the method of least squares to solve simultaneously for the receiver position and the offset of the receiver clock from the true GPS time at the TOA of the target signal fragment. In other words, once the TOT for a satellite is determined, say the $k^{th}$ satellite, the pseudorange $\rho^k$ for that satellite is calculated using simply the TOA for the signal fragment based on the reading of the receiver clock at the moment the target signal arrives. The pseudorange $\rho^k$ is calculated according to:

$$\rho^k = (T_{GPS} - T_{TOT}^k) \cdot c, \qquad (2)$$

where $T_{TOT}^k$ is the TOT for the $k^{th}$ satellite, $T_{GPS}$ is the TOA (in GPS time) of the target signal fragment (which is the same for all satellites), and c is the speed of light. Pseudoranges from usually at least four satellites are then used to solve a set of equations relating the pseudoranges for the satellites to the geometrical (true) ranges to the satellites and to the offset in the receiver clock; the set of equations are:

$$\rho^k = \|\bar{x}_{sv}^k(T_{TOT}^k) - \bar{x}_u(T_{GPS})\| + ct_u, \text{ for } k=1, \ldots M \qquad (3)$$

where $\bar{x}_{SV}^k(T_{TOT}^k)$ is the position of the $k^{th}$ satellite vehicle (SV) at the time of transmission of the target signal fragment, $\bar{x}_u(T_{GPS})$ is the position of the GPS receiver at the time of arrival of the target signal fragment, and $t_u$ is the offset of the receiver clock from true GPS time at the moment of arrival of the signal fragment. The solution of the set of equations (3) yields both the receiver position and the offset in the receiver clock compared to GPS time at the moment of arrival of the target signal fragment.

Sometimes, in poor signal conditions, the navigation message from a GPS satellite cannot be decoded (accurately) by a GPS receiver, even though the receiver is able to track the GPS satellite and so obtain the millisecond part of the TOT. In such a situation, the time stamp of the satellite signal cannot be discerned, and so although the quantity $N_{ms}^k + N_{chip}^k + \Delta_{chip}^k$ of equation (1) could be determined from any point of the received signal, there is no point of the received signal for which the time of transmission is known.

The prior art teaches that if an estimate of the GPS time at which a target signal fragment has arrived from a satellite is known by some means, then the time of transmission by the satellite can be estimated using:

$$T_{TOT}^k = T_{GPS} - \tilde{N}_{ms}^k - N_{chip}^k - \Delta_{chip}^k, \qquad (4)$$

where $\tilde{N}_{ms}^k$ is the time duration corresponding to the whole number of (1 ms) PRN code epochs transmitted during the propagation of the target signal fragment, and the other terms are as in equation (1), and $\tilde{N}_{ms}^k$ is calculated using the known location of a reference landmark (e.g. a base station of a cellular communication network) within 1 ms range of the GPS receiver. Thus, if $\bar{x}_{ref}$ is the known position of the reference landmark, and using the notation $\lfloor \ldots \rfloor$ to indicate rounding down to the nearest integer, then $$\tilde{N}_{ms}^k = \left\lfloor \frac{\|\bar{x}_{SV}^k(T_{TOT}^k) - \bar{x}_{ref}(\hat{T}_{GPS})\|}{c} \cdot 1000 \right\rfloor \qquad (5)$$

$$= \left\lfloor \frac{\|\bar{x}_{SV}^k(T_{TOT}^k) - \bar{x}_u(T_{GPS})\|}{c} \cdot 1000 \right\rfloor$$

yielding the time of flight in milliseconds, since the time of arrival of the target signal fragment $\hat{T}_{GPS}$ at the reference landmark is, by assumption, within one millisecond of the time of arrival $T_{GPS}$ at the GPS receiver.

The invention solves the problem of determining the pseudoranges without use of navigation data in two other ways, compared to the prior art. Not having to rely on navigation data, the invention is thus able to provide information (pseudoranges) useful in estimating the position of a GPS receiver when navigation data is unavailable, such as in poor signal conditions, or when a GPS receiver is first turned on, before enough time has elapsed for the GPS receiver to accumulate the bits constituting the navigation data from the required number of satellites, so that the invention also provides a first fast estimate of the position of a GPS receiver.

It should be mentioned that besides the prior art teaching of using a reference landmark, it is also known to provide pseudoranges without the navigation data based on using an estimate of the TOT of target signal fragments from the required number of satellites, all biased to the same extent. (See e.g. *Time recovery through fusion of inaccurate network timing assistance with GPS measurement* by J. Syrjärinne, Proc. $3_{rd}$ Int. Conference on Information Fusion, Paris, France, Jul. 10–13, 2000, Vol. II, pp. WeD5-3-WeD5-10; and see also *Possibilities for GPS Time recovery with GSM Network Assistance* by J. Syrjärinne, in Proc. ION GPS 2000, Salt Lake City, Utah, USA, Sep. 19–22, 2000.) Although such an approach does yield a position and time solution (or more generally a position, velocity and time (PVT) solution), the method of the invention is aimed at providing a more robust solution procedure, one providing reasonable operating in larger uncertainty area of first initial time and position estimates.

SUMMARY OF THE INVENTION

Accordingly, the present invention provides an apparatus, system and corresponding method for measuring a pseudorange from a ranging receiver to a beacon, the ranging receiver for receiving a ranging signal transmitted by the beacon, the ranging signal including a target ranging signal fragment that arrives at the ranging receiver at the time the pseudorange measurement is being made, the ranging signal having a code component including a sequence of chips having a predetermined epoch and also having an information component including a sequence of information elements, the method including the steps of: evaluating the quality of the ranging signal; if the quality of the ranging signal allows a determination of the occurrence in the ranging signal of the start of the information element received just prior to the target ranging signal fragment, then determining the time of transmission of the target ranging signal fragment based on an estimate of the start time for the information element beginning just before the target ranging signal fragment, and also based on the epoch count between the last information element and the target ranging signal fragment and the integer and fractional chip count between the end of the last code epoch and the target ranging signal fragment; or (even in some cases where the quality of the ranging signal allows a determination of the occurrence in the ranging signal of the start of the information element received just prior to the target ranging signal fragment, but usually where this is not so) determining the time of transmission of the target ranging signal fragment based on an estimate of the time corresponding to the start of the code epoch that just precedes the target ranging signal fragment, and also based on the integer and fractional chip count between the end of the last code epoch and the target ranging signal fragment.

In a further aspect of the invention, the information component is a navigation data component and the information elements are navigation data bits, and each bit of the navigation data component typically has a duration that encompasses a plurality of epochs of chips of the code component.

In a still further aspect of the invention, in some applications, where the quality of the ranging signal allows a determination of the occurrence in the ranging signal of the start of the information element received just prior to the target ranging signal fragment, the time of transmission $T_{TOT}$ of the target ranging signal fragment is often calculated using the formula:

$$T_{TOT} = \mathrm{round}\left(\frac{T_{StartNavBit}}{\tau_{nav}}\right) \cdot \tau_{nav} + (N_{epoch} - N_{EpochAtLastBit})\tau_{code} + M_{chip}\tau_{chip},$$

in which $\tau_{nav}$ is the duration of a single navigation data bit, where $T_{StarNavBit}$, the bit start time for the bit beginning just before the target ranging signal fragment, is often calculated using the formula:

$$T_{StarNavBit} = \hat{T}_{GPS} - T_{TOF} - (N_{epoch} - N_{EpochAtLastBit})\tau_{code} - M_{chip}\tau_{chip} + \Delta_{SatClock}\{\hat{T}_{GPS} - T_{TOF} - (N_{epoch} - N_{EpochAtLastBit})\tau_{code} - M_{chip}\tau_{chip}\}$$

in which $\hat{T}_{GPS}$ is an estimate of the time at which the position measurement is being made by the ranging receiver;

$T_{TOF}$ is the time of flight, from the beacon to the ranging receiver, of the target ranging signal fragment;

$\Delta_{SatClock}(t)$ is a time-dependent correction of the beacon clock to a standard time;

$N_{epoch}$ is the code epoch count provided by a module of the ranging receiver responsible for baseband processing;

$N_{EpochAtLastBit}$ is the code epoch count at the last bit edge starting before the target ranging signal fragment and is also provided by the ranging receiver baseband processing module;

$M_{chip}$ is the integer and fractional chip count between the end of the last code epoch and the target ranging signal fragment, and is also provided by the ranging receiver baseband processing module; and $\tau_{chip}$ is the duration of a chip of the code component.

In another still further aspect of the invention, in some applications, usually where the quality of the ranging signal does not allow a determination of the occurrence in the ranging signal of the start of the information element received just prior to the target ranging signal fragment, the time of transmission $T_{TOT}$ of the target ranging signal fragment is often calculated using the formula:

$$T_{TOT} = \mathrm{round}\left(\frac{T_{StartCode}}{\tau_{code}}\right) \cdot \tau_{code} + M_{chip} \cdot \tau_{chip},$$

where $\tau_{code}$ is the period of the code, and where $T_{Startcode}$, the estimate of the time corresponding to the start of the code epoch that just precedes the target ranging signal fragment, is often calculated using the formula:

$$T_{StartCode} = \hat{T}_{GPS} - T_{TOF} - M_{chip}\tau_{chip} + \Delta_{SatClock}(\hat{T}_{GPS} - T_{TOF} - M_{chip}\tau_{chip}),$$

where the quantities on the right hand side of the equation are as above.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention provides two ways in which to calculate the so-called pseudoranges to one or more satellites of the Global Positioning System (GPS) so that the position of a GPS receiver can be determined. The invention however is not limited to use in connection with GPS. It is of use in any positioning system in which a pseudorange is used as the basis for navigation.

For calculating the part of pseudoranges which cannot be calculated as usual because of missing navigation data, the invention uses bit edge information (for navigation data bits) or, if bit edge information is not available, a millisecond count from a reference GPS time, such as the beginning of the current week. The description here is in the context of a GPS receiver making a position measurement at a scheduled time, based on receiving direct spread sequence signals from a number of GPS satellites, each signal including a pseudorandom number (PRN) code having an epoch of 1 ms and including 1,023 bits (called chips), and also including frames of navigation data, each frame including 5 subframes, each of 300 bits, and each bit having a duration of 20 ms (so that the navigation data is transmitted at 50 Hz). The description uses the following notation:

$\hat{T}_{GPS}$ is an estimate of the time at which a position measurement is being made by the GPS receiver, i.e. an estimate of the time of arrival (TOA) of target signal fragments upon which the position measurement is based, and is in terms of an amount of time (number of milliseconds or other units, as appropriate) since a reference time (such as the beginning of the current GPS week);

$T_{TOF}$ is the time of flight (a duration, not a time), from the spacecraft to the GPS receiver, of the target signal fragment upon which the pseudorange measurement is based, an estimate for which is assumed known (an estimate of approximately 70 ms being used if no better estimate is available) and indicated as $\hat{T}_{TOF}$ (a cap on a quantity being used here to indicate an approximate or estimated value for the capped quantity);

$T_{TOT}^k$ is the time of transmission of the target signal fragment from the $k^{th}$ satellite, the time to be determined;

$\Delta_{SatClock}^k(t)$ is a correction to true GPS time of the satellite clock for the $k^{th}$ satellite, a correction that varies with time and so is indicated to be a function of time;

$N_{epoch}$ is the code epoch count (each epoch being 1 ms in duration), which is provided by a module of the GPS receiver that performs baseband processing, called here the GPS receiver baseband module;

$N_{EpochAtLastBit}$ is the code epoch count at the last (navigation data) bit edge (a bit being 20 ms), and is also provided by the GPS receiver baseband module;

$M_{chip}$ is the integer and fractional chip count between the end of the last full code epoch transmitted before the target signal fragment and the target signal fragment, and is also provided by the GPS receiver baseband module;

$\tau_{code}$ is the period (epoch) of the PRN code (1 ms);

$\tau_{nav}$ is the duration of a single navigation data bit (20 ms); and $\tau_{chip}$ is the chip duration (1/1023 ms).

As in some of the prior art described above, the invention uses time and position estimates based on the location of a reference landmark (for example from a base station of a cellular communication system with which the GPS receiver is in communication). As explained in connection with some of the prior art, even if (navigation data) bit edge information is not available, the sub-millisecond part of the time of transmission (TOT), i.e. the quantity $N_{chip}^k + \Delta_{chip}^k$ of equation (1), which is here indicated as $M_{chip}$ (suppressing the spacecraft index k), is still provided by the GPS receiver's baseband module. As a result, given the time and position estimate based on a reference landmark, there is an uncertainty in the pseudorange being determined that is some integral number of milliseconds (each ms corresponding to approximately 300 km of range), as mentioned above in connection with the prior art. If bit edge information is available, then the sub-20-millisecond part of the TOT (i.e. the quantity $N_{ms}^k$ of equation (1) above) is provided by the receiver baseband module. The uncertainty in pseudorange in this case is an integral multiple of 20 ms (each 20 ms corresponding to approximately 6000 km). That means that if our estimate of position and time of our GPS receiver (based on a reference) is close enough to the true position and time for the GPS receiver, then we can accurately recover the TOT in one or the other of the two following ways, one using bit edge information and the other not using bit edge information.

If the bit edge information is not available, then the TOT, say for the $k^{th}$ satellite (but suppressing the k superscript), is calculated as:

$$T_{TOT} = \text{round}\left(\frac{T_{StartCode}}{\tau_{code}}\right) \cdot \tau_{code} + M_{chip} \cdot \tau_{chip} \quad (6)$$

$$= \frac{\text{round}(T_{StartCode} \cdot 1000 \text{ s}^{-1})}{1000 \text{ s}^{-1}} + \frac{M_{chip}}{1023000} \text{ s}$$

where round() denotes a function that provides as an output the integer closest to the argument (and so rounds up or down, as appropriate), and where $T_{StartCode}$, called here the last code start time, is the estimate of time corresponding to the start of the PRN epoch (1 ms long) that just precedes the TOT (and so may not be completed by the TOT), but with a twist: $T_{StartCode}$ is taken in equation (6) to be a number of milliseconds from the start of the current GPS week, and so indicates both a time duration and a time. Thus, the quantity $T_{StartCode}/\tau_{code}$ is dimensionless. The last code start time $T_{StartCode}$ is preferably calculated using:

$$T_{StartCode} = \hat{T}_{GPS} - T_{TOF} - \quad (7)$$

$$M_{chip} \cdot \tau_{chip} + \Delta_{SatClock}(\hat{T}_{GPS} - T_{TOF} - M_{chip} \cdot \tau_{chip})$$

$$= \hat{T}_{GPS} - T_{TOF} - \frac{M_{chip}}{1023000} \text{ s} +$$

$$\Delta_{SatClock}\left(\hat{T}_{GPS} - T_{TOF} - \frac{M_{chip}}{1023000} \text{ s}\right)$$

($\hat{T}_{GPS}$ being measured from the same reference time as $T_{StartCode}$, namely the beginning of the current GPS week), so that $\hat{T}_{GPS}$ is, like $T_{StartCode}$, both a time and a duration.

When bit edge information is available, e.g. from a bit-synchronization algorithm, the invention calculates the pseudorange, say for the $k_{th}$ satellite (but again suppressing the k superscript), as follows:

$$T_{TOT} = \text{round}\left(\frac{T_{StartNavBit}}{\tau_{nav}}\right) \cdot \tau_{nav} + \quad (8)$$

$$(N_{epoch} - N_{EpochAtLastBit})\tau_{code} + M_{chip}\tau_{chip}$$

$$= \frac{\text{round}(T_{StartNavBit} \cdot 50 \text{ s}^{-1})}{50 \text{ s}^{-1}} + \frac{N_{epoch} - N_{EpochAtLastBit}}{1000} \text{ s} +$$

$$\frac{M_{chip}}{1023000} \text{ s}$$

where $T_{StartNavBit}$, called here the last bit start time, is the estimate of the bit (20 ms in duration) start time for the bit beginning just before the TOT (i.e. just before the target signal fragment is transmitted), and is, like $T_{StartCode}$, the time duration measured in milliseconds from a reference time, such as the beginning of the GPS week, so that it is also both a time and a time duration, and hence $T_{StartNavBit}/\tau_{nav}$ is dimensionless. The last bit start time is preferably calculated using:

$$T_{StartNavBit} = \hat{T}_{GPS} - T_{TOF} - (N_{epoch} - N_{EpochAtLastBit})\tau_{code} - \quad (9)$$

$$M_{chip}\tau_{chip} + \Delta_{SatClock}\{\hat{T}_{GPS} - T_{TOF} -$$

$$(N_{epoch} - N_{EpochAtLastBit})\tau_{code} - M_{chip}\tau_{chip}\}$$

$$= \hat{T}_{GPS} - T_{TOF} - \frac{N_{epoch} - N_{EpochAtLastBit}}{1000} \text{ s} - \frac{M_{chip}}{1023000} \text{ s} +$$

$$\Delta_{SatClock}\left(\hat{T}_{GPS} - T_{TOF} - \frac{N_{epoch} - N_{EpochAtLastBit}}{1000} \text{ s} -\right.$$

$$\left.\frac{M_{chip}}{1023000} \text{ s}\right)$$

($\hat{T}_{GPS}$ being measured from the same reference time as $T_{StartNavBit}$, namely the beginning of the current GPS week), so that $\hat{T}_{GPS}$ is, like $T_{StartNavBit}$, both a time and a duration.

In either calculation of a TOT, pseudoranges are then calculated from the TOT as in the prior art, i.e. according to:

$$\rho^k = (T_{GPS} - T_{TOT}^k) \cdot c, \quad (10)$$

in which the index indicating the $k^{th}$ spacecraft is now provided, and where c is the speed of light.

The invention is more robust when bit-edge information is used. Bit edge information might be available for some of the required number of satellites and not available for others. If bit-edge information is available for a satellite, the pseudorange calculation using the bit edge information should be used to ensure a more robust solution.

It should be understood that the invention allows the use of navigation data in determining some of the pseudoranges needed for the navigation solution. No matter how the pseudoranges are determined, the solution, given the pseudoranges, proceeds as in the prior art. Thus, in poor signal conditions, the navigation data for some satellites might be available, and might not be available for others. In such a situation, the invention might be used to calculate the TOT only for those satellites for which the navigation data is not available (by either of the two ways, preferably using the data bit edge information if that is available), and the pseudoranges for the other satellites would be calculated as in a conventional calculation (i.e. using equation (1) above).

Figure 1:
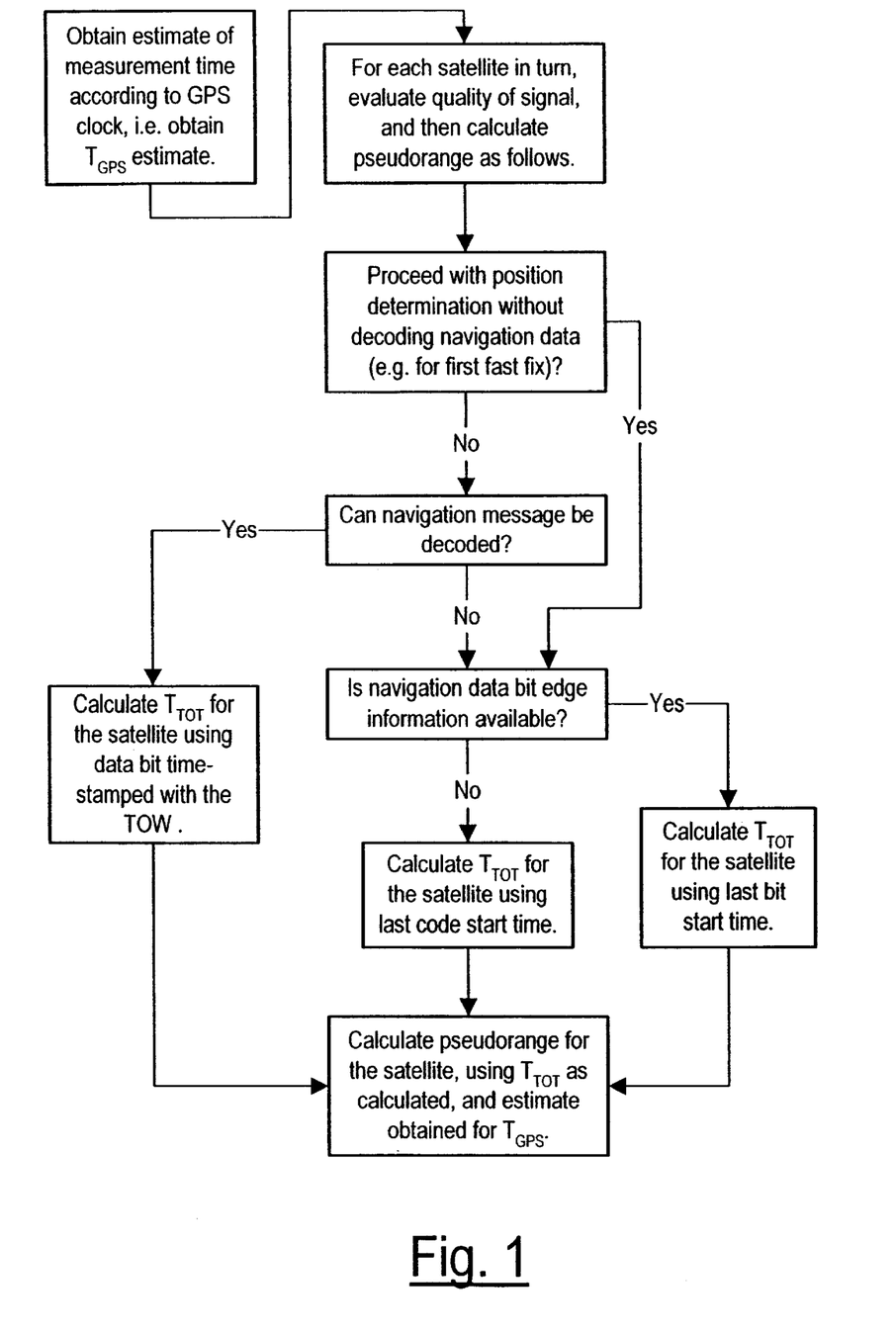
FIG. 1 is a flow chart of a method according to the invention.

Referring now to FIG. 1, a flowchart of a method for determining the time of transmission of a target signal fragment (say from a $k^{th}$ satellite) according to the invention is shown as beginning with a first step in which at the scheduled moment for a position measurement, a GPS receiver obtains an estimate of the time, according to the GPS clock, at which the measurement is being made. The estimate for example provided by a cellular base station in cellular communication with the GPS receiver, which is therefore outfitted with an antenna for receiving the cellular communication signals, as well as an antenna for receiving the GPS ranging signals. (See FIG. 2.) To provide such an estimate, a nearby cellular base station might, for example, provide time-stamped signals indicating GPS time. Such signals would be sufficient to synchronize the GPS receiver clock to GPS time accurately enough for a good pseudorange measurement. Then the GPS receiver proceeds with a pseudorange measurement for each of the required number of satellites (the required number depending on what is being solved for, and depending on whether a method of solution using the minimum number of satellites possible is being used, or a method using more than the minimum number, such as a least squares solution), according to one of three ways: the conventional way, based on decoding the navigation data (if it is desired to do so, and if the signal conditions permit); using the navigation data bit edge, if it is available, to calculate the last bit start time $T_{StartNavBit}$, and then the time of transmission, and so on; or calculating the last code start time $T_{StartPN}$ and then the time of transmission, and so on.

Figure 2:
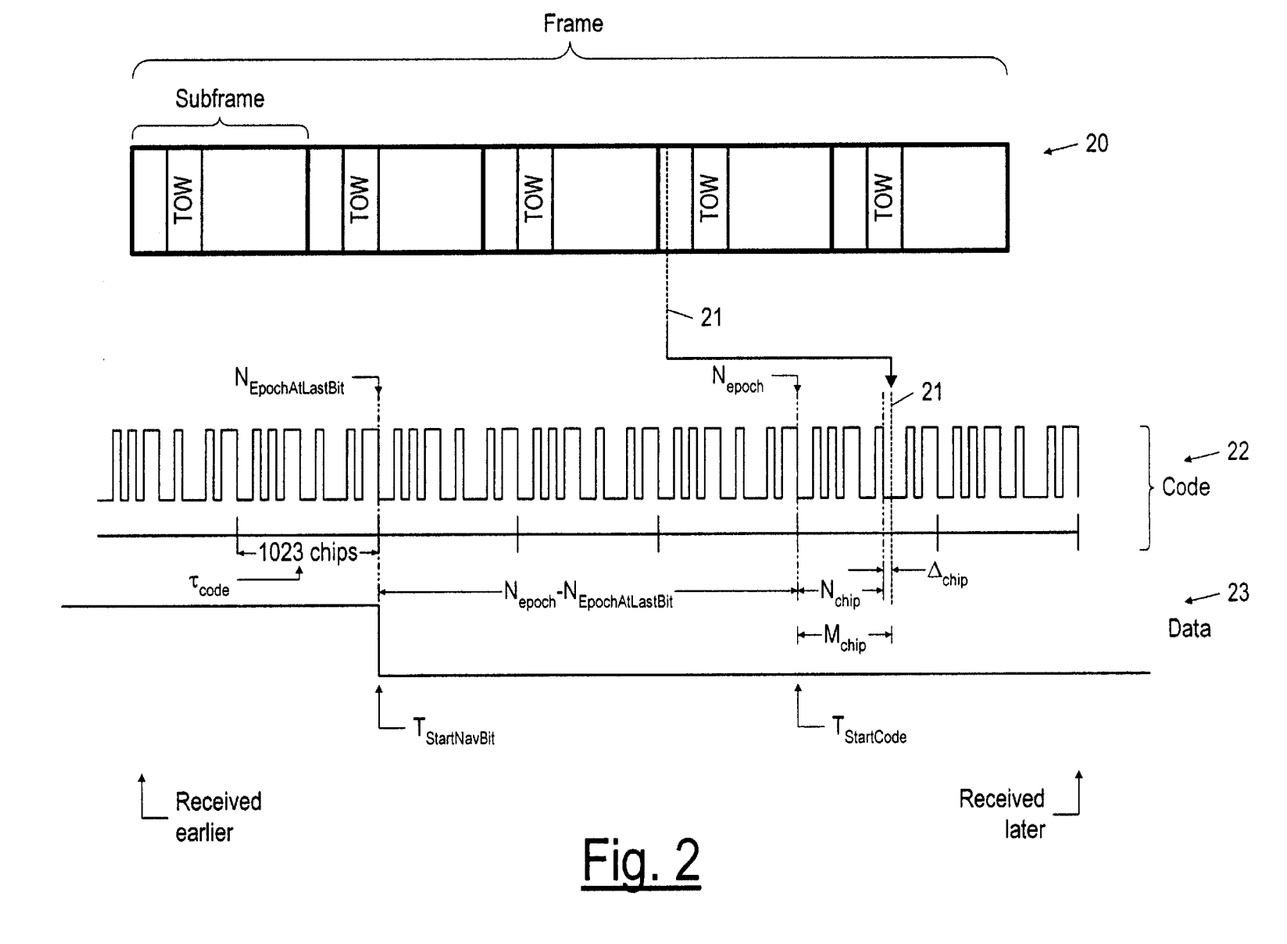
FIG. 2 is an illustration of a ranging signal.

Referring now to FIG. 2, an illustration of the ranging signal in the vicinity of the target signal fragment is shown at two levels of detail. At the higher level, the ranging signal is shown as a frame 20 consisting of five subframes, and the target signal fragment is indicated by a simple dashed line 21 as a particular (sampled) point on the ranging signal. At the more detailed level, the ranging signal in the vicinity of the target signal fragment has both a code structure 22 and a data component structure 23 (which modulate a carrier after being added together using modulo 2 addition). As in the higher-level view, the target signal fragment is shown in the more detailed view as a (sampled) point on the ranging signal indicated by the simple dashed line 21, and is in fact shown as having been transmitted at a time duration corresponding to the number of (full) code epochs occurring since the last leading edge data bit was transmitted and the target signal fragment was transmitted, i.e. $N_{epoch}-N_{EpochAtLastBit}$, plus the number of chips $N_{chip}^k$ and fractional number of chips $\Delta_{chip}^k$ occurring since the last full epoch was transmitted and the target signal fragment was transmitted, i.e. $M_{chip}$. If the position of the bit edge cannot be determined, then the time of transmission of the target signal fragment indicated by the simple dashed line 22 is based only on determining $M_{chip}$, and determining $T_{StarCode}$ as in equation (6) above.

Figure 3:
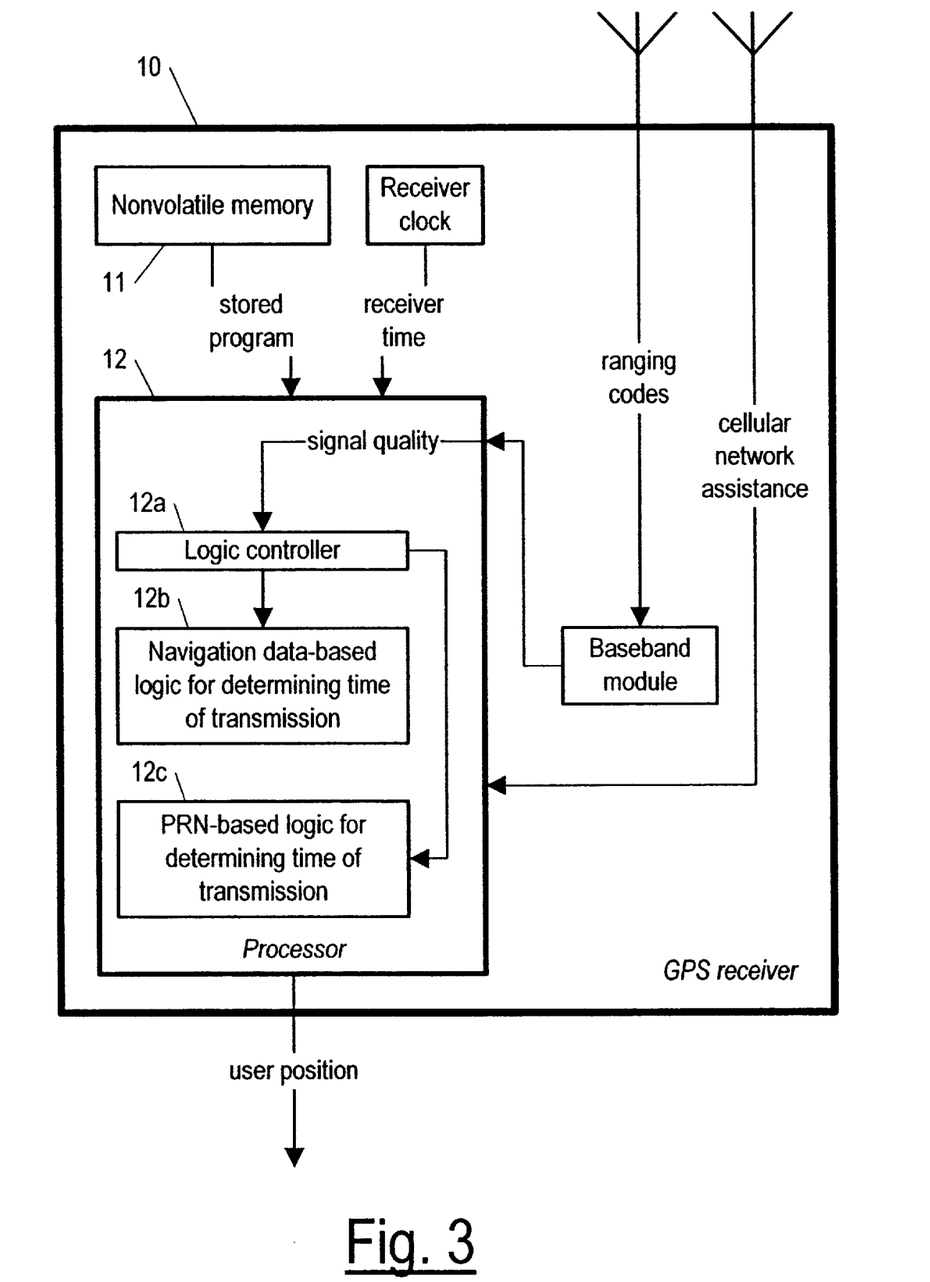
FIG. 3 is a block diagram/flow diagram of a GPS receiver of a type in which the present invention could be implemented.

Referring now to FIG. 3, in the preferred embodiment of the invention, a GPS receiver 10 includes a nonvolatile memory 11 for storing a program that, when running on a processor 12 also included in the GPS receiver, determines the position of the GPS receiver by solving the above system (3) of pseudorange equations by one or another technique known in the art. The GPS receiver includes a receiver clock (usually an inexpensive clock that must be synchronized with GPS time when the receiver is turned on), an antenna for receiving (ranging) signal from GPS satellites and also includes an antenna for receiving signals from a cellular network (not shown) providing one or another source of assistance to the GPS receiver in calculating its position. The cellular network could provide not only a time-stamped signal useful to the GPS receiver in approximately synchronizing its local clock with GPS time, but could also provide the results of the calculations needed in the position determination; in providing such calculatory assistance, the cellular network would receive from the GPS receiver the measured quantities needed to determine either $T_{StartCode}$ or $T_{StartNavBit}$, namely $M_{chip}$ in the case of $T_{StartCode}$, and $M_{chip}$, $N_{epoch}$, and $N_{EpochAtLastBit}$ in the case of $T_{StartNavBit}$. The cellular network would then determine either $T_{StartCode}$ or $T_{StartNavBit}$, then the time of transmission, and finally the pseudorange for the subject satellite, and then return the result to the GPS receiver. The organization of a software implementation according to the preferred embodiment is shown in FIG. 3 as including a logic controller 12a that determines, on the basis of signal quality information (which could be determined by the GPS receiver or could be provided by an external source) whether to determine the time of transmission (of a particular target signal fragment) on the basis of the location of a bit of the navigation data (using a first module 12b) or on the basis purely of chips of the PRN code (using a second module 12c), as explained above in connection with FIG. 2. The controller activates one or another of the two modules 12b 12c for determining the time of transmission on the basis of the signal quality. As shown in FIG. 3, the controller 12a acquires the signal quality preferably from measurements performed by the baseband module, but the signal quality can also be determined by the logic controller based on raw data provided through the baseband module, and it can also be provided by an external source (that arrangement not being shown in FIG. 3).

SCOPE OF THE INVENTION

It is to be understood that the above-described arrangements are only illustrative of the application of the principles of the present invention. In particular, although the invention has been described in connection with the well-known global positioning system, it is clear from the description that the invention is in no way limited to use with GPS (ranging) receivers; the invention is of use with ranging receivers used in connection with any positioning or navigation system in which pseudoranges are calculated. Moreover, the invention is of use not only in case of satellite vehicles of e.g. a global positioning system providing ranging signals, but in case of ranging signals being provided by any kind of beacon, including for example land-based stations of a wireless telecommunications system. In addition, the invention is not limited to applications in which the ranging signal includes standard navigation data, but also includes applications in which the ranging signal includes other kinds of information components consisting of a plurality of information elements. Numerous other modifications and alternative arrangements may be devised by those skilled in the art without departing from the spirit and scope of the present invention, and the appended claims are intended to cover such modifications and arrangements.

What is claimed is:

1. A method for measuring a pseudorange from a ranging receiver to a beacon, the ranging receiver for receiving a ranging signal transmitted by the beacon, the ranging signal including a target ranging signal fragment that arrives at the ranging receiver at the time the pseudorange measurement is being made, the ranging signal having a code component including a sequence of chips having a predetermined epoch and also having an information component including a sequence of information elements, the method comprising the steps of:

a) evaluating the quality of the ranging signal;
 b) if the quality of the ranging signal allows a determination of the occurrence in the ranging signal of the start of the information element received just prior to the target ranging signal fragment, then determining the time of transmission of the target ranging signal fragment based on an estimate of the start time for the information element beginning just before the target ranging signal fragment, and also based on the epoch count between the last information element and the target ranging signal fragment and the integer and fractional chip count between the end of the last code epoch and the target ranging signal fragment; or c) determining the time of transmission of the target ranging signal fragment based on an estimate of the time corresponding to the start of the code epoch that just precedes the target ranging signal fragment, and also based on the integer and fractional chip count between the end of the last code epoch and the target ranging signal fragment.

2. The method of claim 1, wherein the information component is a navigation data component and the information elements are navigation data bits.

3. The method of claim 2, wherein each bit of the navigation data component has a duration that encompasses a plurality of epochs of chips of the code component.

4. The method of claim 3, wherein the bit start time $T_{StartNavBit}$ for the bit beginning just before the target ranging signal fragment is calculated using the formula:

$$T_{StartNavBit} = \hat{T}_{GPS} - T_{TOF} - (N_{epoch} - N_{EpochAtLastBit})\tau_{code} - M_{chip}\tau_{chip} + \Delta_{SatClock}\{\hat{T}_{GPS} - T_{TOF} - (N_{epoch} - N_{EpochAtLastBit})\tau_{code} - M_{chip}\tau_{chip}\}$$

in which $\hat{T}_{GPS}$ is an estimate of the time at which the position measurement is being made by the ranging receiver;

$T_{TOF}$ is the time of flight, from the beacon to the ranging receiver, of the target ranging signal fragment;

$\Delta_{SatClock}(t)$ is a time-dependent correction of the beacon clock to a standard time;

$N_{epoch}$ is the code epoch count provided by a module of the ranging receiver responsible for baseband processing;

$N_{EpochAtLastBit}$ is the code epoch count at the last bit edge starting before the target ranging signal fragment and is also provided by the ranging receiver baseband processing module;

$M_{chip}$ is the integer and fractional chip count between the end of the last code epoch and the target ranging signal fragment, and is also provided by the ranging receiver baseband processing module; and $\tau_{chip}$ is the duration of a chip of the code component.

5. The method of claim 4, wherein the time of transmission $T_{TOT}$ of the target ranging signal fragment is calculated using the formula:

$$T_{TOT} = \mathrm{round}\left(\frac{T_{StartNavBit}}{\tau_{nav}}\right) \cdot \tau_{nav} + (N_{epoch} - N_{EpochAtLastBit})\tau_{code} + M_{chip}\tau_{chip},$$

in which $\tau_{nav}$ is the duration of a single navigation data bit.

6. The method of claim 3 wherein the estimate of the time corresponding to the start of the code epoch that just precedes the target ranging signal fragment is calculated using the formula:

$$T_{StartCode} = \hat{T}_{GPS} - T_{TOF} - M_{chip}\tau_{chip} + \Delta_{SatClock}(\hat{T}_{GPS} - T_{TOF} - M_{chip}\tau_{chip})$$

in which $\hat{T}_{GPS}$ is an estimate of the time at which the position measurement is being made by the ranging receiver;

$T_{TOF}$ is the time of flight, from the spacecraft to the ranging receiver, of the target ranging signal fragment;

$\Delta_{SatClock}(t)$ is a time-dependent correction of the satellite clock to a standard time;

$M_{chip}$ is the integer and fractional chip count between the end of the last code epoch and the target ranging signal fragment, and is also provided by the ranging receiver baseband processing module; and $\tau_{chip}$ is the duration of a chip of the code component.

7. The method of claim 6, wherein the time of transmission $T_{TOT}$ of the target ranging signal fragment is calculated using the formula:

$$T_{TOT} = \mathrm{round}\left(\frac{T_{StartCode}}{\tau_{code}}\right) \cdot \tau_{code} + M_{chip} \cdot \tau_{chip},$$

in which $\tau_{code}$ is the period of the code.

8. An apparatus for use in a ranging receiver, for measuring a pseudorange from the ranging receiver to a beacon, the ranging receiver for receiving a ranging signal transmitted by the beacon, the ranging signal including a target ranging signal fragment that arrives at the ranging receiver at the time the pseudorange measurement is being made, the ranging signal having a code component including a sequence of chips having a predetermined epoch and also having an information component including a sequence of information elements, the apparatus comprising:

a) a controller means, for acquiring the result of an evaluation of the quality of the ranging signal, and for providing the quality of the ranging signal, and also for providing control signals indicating whether a first transmission time measuring means or a second transmission time measuring means is to be used to determine the time of transmission of the target ranging signal fragment;

b) the first transmission time measuring means, operative under the direction of the controller means, responsive to the quality of the ranging signal, for determining the time of transmission of the target ranging signal fragment based on an estimate of the start time for the information element beginning just before the target ranging signal fragment, and also based on the epoch count between the last information element and the target ranging signal fragment and the integer and fractional chip count between the end of the last code epoch and the target ranging signal fragment, the first transmission time measuring means operative only if the quality of the ranging signal allows a determination of the occurrence in the ranging signal of the start of the information element received just prior to the target ranging signal fragment; and c) the second transmission time measuring means, also operative under the direction of the controller means, for determining the time of transmission of the target ranging signal fragment based on an estimate of the time corresponding to the start of the code epoch that just precedes the target ranging signal fragment, and also based on the integer and fractional chip count between the end of the last code epoch and the target ranging signal fragment.

9. The apparatus of claim 8, wherein the information component is a navigation data component and the information elements are navigation data bits.

10. The apparatus of claim 9, wherein each bit of the navigation data component has a duration that encompasses a plurality of epochs of chips of the code component.

11. The apparatus of claim 10, wherein the bit start time $T_{StartNavBit}$ for the bit beginning just before the target ranging signal fragment is calculated using the formula:

$$T_{StartNavBit} = \hat{T}_{GPS} - T_{TOF} - (N_{epoch} - N_{EpochAtLastBit})\tau_{code} - M_{chip}\tau_{chip} + \Delta_{SatClock}\{\hat{T}_{GPS} - T_{TOF} - (N_{epoch} - N_{EpochAtLastBit})\tau_{code} - M_{chip}\tau_{chip}\}$$

in which $\hat{T}_{GPS}$ is an estimate of the time at which the position measurement is being made by the ranging receiver;

$T_{TOF}$ is the time of flight, from the beacon to the ranging receiver, of the target ranging signal fragment;

$\Delta_{SatClock}(t)$ is a time-dependent correction of the beacon clock to a standard time;

$N_{epoch}$ is the code epoch count provided by a module of the ranging receiver responsible for baseband processing;

$N_{EpochAtLastBit}$ is the code epoch count at the last bit edge starting before the target ranging signal fragment and is also provided by the ranging receiver baseband processing module;

$M_{chip}$ is the integer and fractional chip count between the end of the last code epoch and the target ranging signal fragment, and is also provided by the ranging receiver baseband processing module; and $\tau_{chip}$ is the duration of a chip of the code component.

12. The apparatus of claim 11, wherein the time of transmission $T_{TOT}$ of the target ranging signal fragment is calculated using the formula:

$$T_{TOT} = \text{round}\left(\frac{T_{StartNavBit}}{\tau_{nav}}\right) \cdot \tau_{nav} + (N_{epoch} - N_{EpochAtLastBit})\tau_{code} + M_{chip}\tau_{chip},$$

in which $\tau_{nav}$ is the duration of a single navigation data bit.

13. The apparatus of claim 10 wherein the estimate of the time corresponding to the start of the code epoch that just precedes the target ranging signal fragment is calculated using the formula:

$$T_{StartCode} = \hat{T}_{GPS} - T_{TOF} - M_{chip}\tau_{chip} + \Delta_{SatClock}(\hat{T}_{GPS} - T_{TOF} - M_{chip}\tau_{chip})$$

in which $\hat{T}_{GPS}$ is an estimate of the time at which the position measurement is being made by the ranging receiver;

$T_{TOF}$ is the time of flight, from the spacecraft to the ranging receiver, of the target ranging signal fragment;

$\Delta_{SatClock}(t)$ is a time-dependent correction of the satellite clock to a standard time;

$M_{chip}$ is the integer and fractional chip count between the end of the last code epoch and the target ranging signal fragment, and is also provided by the ranging receiver baseband processing module; and $\tau_{chip}$ is the duration of a chip of the code component.

14. The apparatus of claim 13, wherein the time of transmission $T_{TOT}$ of the target ranging signal fragment is calculated using the formula:

$$T_{TOT} = \text{round}\left(\frac{T_{StartCode}}{\tau_{code}}\right) \cdot \tau_{code} + M_{chip} \cdot \tau_{chip},$$

in which $\tau_{code}$ is the period of the code.

15. A system, comprising:

i) a satellite vehicle for providing a ranging signal;

ii) a ranging receiver, the ranging receiver including an apparatus for measuring a pseudorange from the ranging receiver to a beacon, the ranging receiver for receiving a ranging signal transmitted by the beacon, the ranging signal including a target ranging signal fragment that arrives at the ranging receiver at the time the pseudorange measurement is being made, the ranging signal having a code component including a sequence of chips having a predetermined epoch and also having an information component including a sequence of information elements, the apparatus comprising:

a) a controller means, for acquiring the result of an evaluation of the quality of the ranging signal, and for providing the quality of the ranging signal, and also for providing control signals indicating whether a first transmission time measuring means or a second transmission time measuring means is to be used to determine the time of transmission of the target ranging signal fragment;

b) the first transmission time measuring means, operative under the direction of the, controller means, responsive to the quality of the ranging signal, for determining the time of transmission of the target ranging signal fragment based on an estimate of the start time for the information element beginning just before the target ranging signal fragment, and also based on the epoch count between the last information element and the target ranging signal fragment and the integer and fractional chip count between the end of the last code epoch and the target ranging signal fragment, the first transmission time measuring means operative only if the quality of the ranging signal allows a determination of the occurrence in the ranging signal of the start of the information element received just prior to the target ranging signal fragment; and c) the second transmission time measuring means, also operative under the direction of the controller means, for determining the time of transmission of the target ranging signal fragment based on an estimate of the time corresponding to the start of the code epoch that just precedes the target ranging signal fragment, and also based on the integer and fractional chip count between the end of the last code epoch and the target ranging signal fragment.

16. The system of claim 15, wherein the information component is a navigation data component and the information elements are navigation data bits.

17. The system of claim 16, wherein each bit of the navigation data component has a duration that encompasses a plurality of epochs of chips of the code component.

18. The system of claim 17, wherein the bit start time $T_{StartNavBit}$ for the bit beginning just before the target ranging signal fragment is calculated using the formula:

$$T_{StartNavBit} = \hat{T}_{GPS} - T_{TOF} - (N_{epoch} - N_{EpochAtLastBit})\tau_{code} - M_{chip}\tau_{chip} + \Delta_{SatClock}\{\hat{T}_{GPS} - T_{TOF} - (N_{epoch} - N_{EpochAtLastBit})\tau_{code} - M_{chip}\tau_{chip}\}$$

in which $\hat{T}_{GPS}$ is an estimate of the time at which the position measurement is being made by the ranging receiver;

$T_{TOF}$ is the time of flight, from the beacon to the ranging receiver, of the target ranging signal fragment;

$\Delta_{SatClock}(t)$ is a time-dependent correction of the beacon clock to a standard time;

$N_{epoch}$ is the code epoch count provided by a module of the ranging receiver responsible for baseband processing;

$N_{EpochAtLastBit}$ is the code epoch count at the last bit edge starting before the target ranging signal fragment and is also provided by the ranging receiver baseband processing module;

$M_{chip}$ is the integer and fractional chip count between the end of the last code epoch and the target ranging signal fragment, and is also provided by the ranging receiver baseband processing module; and $\tau_{chip}$ is the duration of a chip of the code component.

19. The system of claim 18, wherein the time of transmission $T_{TOT}$ of the target ranging signal fragment is calculated using the formula:

$$T_{TOT} = \text{round}\left(\frac{T_{StartNavBit}}{\tau_{nav}}\right) \cdot \tau_{nav} + (N_{epoch} - N_{EpochAtLastBit})\tau_{code} + M_{chip}\tau_{chip},$$

in which $\tau_{nav}$ is the duration of a single navigation data bit.

20. The system of claim 17 wherein the estimate of the time corresponding to the start of the code epoch that just precedes the target ranging signal fragment is calculated using the formula:

$$T_{StartCode} = \hat{T}_{GPS} - T_{TOF} - M_{chip} \cdot \tau_{chip} + \Delta_{SatClock}(\hat{T}_{GPS} - T_{TOF} - M_{chip} \cdot \tau_{chip})$$

in which $\hat{T}_{GPS}$ is an estimate of the time at which the position measurement is being made by the ranging receiver;

$T_{TOF}$ is the time of flight, from the spacecraft to the ranging receiver, of the target ranging signal fragment;

$\Delta_{SatClock}(t)$ is a time-dependent correction of the satellite clock to a standard time;

$M_{chip}$ is the integer and fractional chip count between the end of the last code epoch and the target ranging signal fragment, and is also provided by the ranging receiver baseband processing module; and $\tau_{chip}$ is the duration of a chip of the code component.

21. The system of claim 20, wherein the time of transmission $T_{TOT}$ of the target ranging signal fragment is calculated using the formula:

$$T_{TOT} = \text{round}\left(\frac{T_{StartCode}}{\tau_{code}}\right) \cdot \tau_{code} + M_{chip} \cdot \tau_{chip},$$

in which $\tau_{code}$ is the period of the code.

22. The system of claim 15, further comprising an external computing facility in wireless communication with the ranging receiver, for assisting either of the two transmission time measuring means in at least some of the computations performed in determining the time of transmission of the target ranging signal fragment.

* * * * *

UNITED STATES PATENT AND TRADEMARK OFFICE
CERTIFICATE OF CORRECTION

PATENT NO.   : 6,466,164 B1
DATED        : October 15, 2002
INVENTOR(S)  : David Akopian et al.

It is certified that error appears in the above-identified patent and that said Letters Patent is hereby corrected as shown below:

Column 5,
Lines 15 and 19, "$T_{StarNavBit}$" should be -- $T_{StartNavBit}$ --.

Column 7,
Lines 44 and 64, "$T_{StarCode}$" should be -- $T_{StartCode}$ --.

Column 8,
Line 1, "$K_{th}$" should be -- $K^{th}$ --.

Column 9,
Line 50, "$T_{StarCode}$" should be -- $T_{StartCode}$ --.

Column 13,
Line 9, "$T_{StartNovBit}$" should be -- $T_{StartNavBit}$ --.

Signed and Sealed this

Eleventh Day of March, 2003

JAMES E. ROGAN
*Director of the United States Patent and Trademark Office*